UNITED STATES PATENT OFFICE.

CHARLES ALDEN, OF NEWBURG, NEW YORK.

IMPROVEMENT IN PROCESSES OF TREATING FISH.

Specification forming part of Letters Patent No. 186,098, dated January 9, 1877; application filed June 5, 1876.

*To all whom it may concern:*

Be it known that I, CHARLES ALDEN, of Newburg, in the county of Orange and State of New York, have invented a new and useful Improvement in Curing Fish, which invention is fully set forth in the following specification.

This invention consists in a product obtained by first exposing the fish to the action of steam, and then to a rapid evaporating process in a humid atmosphere.

In carrying out my invention I proceed as follows: After having caught the fish, I cut off the head, tail, and fins, remove the skins, take out the entrails, and thus prepared I place the fish in a tight vessel on a false perforated bottom, a few inches above the real bottom. Then I let in steam until the fish is in condition to take out; the bones are then separated from the fish. The steamed fish, freed from the bones, is then rubbed through the meshes of wire by the hand, or exposed to friction by other means, or run between rollers and reduced to a flaky condition. The fish is then spread on hurdles, which are introduced successively into a trunk or chamber, into the lower part of which is admitted a current of air heated to about 200°, and after the first hurdle has been exposed to this heat for about ten minutes, I move it up four inches, (more or less,) and introduce a second hurdle of fish, which is exposed to the heat the same as the first hurdle, and then both hurdles are moved up about four inches, and a third hurdle is introduced, and so on until twelve hurdles (more or less) are in the trunk, the distance between the successive hurdles being four inches, (more or less.)

This operation requires about three hours, and during this time the fish on the top hurdle has become cured, and said hurdle is removed from the top of the trunk, while the hurdles below are moved up, and thus room is obtained for a fresh hurdle underneath, so that one hurdle of fish is taken off at the top every ten minutes, (more or less,) and another one is put underneath without interruption.

The hurdles are made to fit close to the trunk, and when covered with fish the heated air cannot escape, except it passes through and round the fish, thereby carrying off the vapor; but in order to let a certain portion of heated air pass up through all the hurdles free from obstruction, I place one or more tubes or rings, about two inches in diameter and three inches high, on different parts of each hurdle through which such portion of heated air may pass.

During this operation the water, as it is evaporated from the fish, forms a vapor, which fills the trunk, thus keeping the fish continuously surrounded by its own vapor, and retaining it in a strictly humid atmosphere.

By these means the fish is prevented from becoming suddenly dry and hard on its surface, and the pores are kept open to allow the water to evaporate freely.

As the fish loses its water gradually during its upward motion in the trunk, the heat to which it is exposed decreases until all the water is removed, except what is held as hydrate, the heat in the lower part of the trunk being about 200°, and in the top part it is decreased to about 100°.

Since fish contains about eighty per cent. of water, the vapors from it, in most cases, will be found sufficient to keep up the required humidity in the trunk; but if additional humidity should be required, vapors may be introduced into the trunk from a steam-jet, or by other means.

Fresh fish cured by my process will keep a long time in any climate, if protected from dampness and insects. It retains all its original qualities, and when soaked in water for a few hours it has the appearance, taste, and flavor of fresh fish. One pound of my steamed and vapor-cured fish is equal to ten pounds of live fish.

What I claim as new, and desire to secure by Letters Patent, is—

The within-described process of treating fish by first steaming the same, then exposing it to friction, and then curing it in a humid atmosphere, substantially as set forth.

In testimony that I claim the foregoing I have hereunto set my hand and seal this 1st day of June, 1876.

CHARLES ALDEN. [L. S.]

Witnesses:
W. HAUFF,
E. F. KASTENHUBER.